United States Patent
Sharma et al.

(10) Patent No.: US 11,985,012 B2
(45) Date of Patent: **\*May 14, 2024**

(54) ROBUST WLAN RECEPTION IN WiFi-BLUETOOTH COMBINATION SYSTEMS BY INTERFERENCE WHITENING

(71) Applicant: Cypress Semiconductor Corporation, San Jose, CA (US)

(72) Inventors: Ankit Sharma, Bengaluru (IN); Suprojit Mukherjee, Kalyani (IN); Ayush Sood, Bangaluru (IN); Ashok Nimmala, Secunderabad (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,733

(22) Filed: Oct. 5, 2022

(65) Prior Publication Data
US 2023/0216714 A1 Jul. 6, 2023

Related U.S. Application Data

(63) Continuation of application No. 17/147,065, filed on Jan. 12, 2021, now Pat. No. 11,489,704.

(51) Int. Cl.
*H04L 25/03* (2006.01)
*H04B 1/525* (2015.01)
*H04W 4/80* (2018.01)
*H04W 84/12* (2009.01)

(52) U.S. Cl.
CPC ....... *H04L 25/03299* (2013.01); *H04B 1/525* (2013.01); *H04L 25/03993* (2013.01); *H04W 4/80* (2018.02); *H04W 84/12* (2013.01)

(58) Field of Classification Search
CPC ........ H04L 25/03299; H04L 25/03993; H04B 1/525; H04W 4/80; H04W 84/12
See application file for complete search history.

(56) References Cited

U.S. PATENT DOCUMENTS

| 11,489,704 | B2* | 11/2022 | Sharma | H04L 25/03993 |
| 2005/0095985 | A1* | 5/2005 | Hafeoz | H04L 25/03178 455/67.11 |
| 2010/0274218 | A1* | 10/2010 | Yodfat | A61M 5/1413 713/168 |

(Continued)

*Primary Examiner* — Benjamin H Elliott, IV (57) ABSTRACT

The embodiments described herein are directed at techniques to de-correlate Bluetooth interference seen across WLAN receive antennas/space in a Bluetooth transceiver/WLAN transceiver combination device. A Bluetooth interference whitening technique may be utilized, wherein a whitening matrix is computed based on a leakage signal resulting from a training signal transmitted by the Bluetooth transceiver. The leakage signal may leak in to the WLAN transceiver and a set of attributes is calculated for each frequency the leakage signal is received on. One or more whitening matrixes are calculated based on the set of attributes for each frequency the leakage signal is received on. In response to the WLAN transceiver receiving a signal of interest, an appropriate whitening matrix from the one or more whitening matrixes is selected and is then applied to the received signal of interest to de-correlate any interference generated as a result of the Bluetooth transmission.

20 Claims, 7 Drawing Sheets

(56) References Cited

U.S. PATENT DOCUMENTS

| | | | | |
|---|---|---|---|---|
| 2010/0303182 A1* | 12/2010 | Daneshrad | H04B 1/10 | 455/63.1 |
| 2011/0051601 A1* | 3/2011 | Linsky | H04L 12/407 | 370/232 |
| 2013/0028305 A1* | 1/2013 | Gollakota | H04J 11/0023 | 375/350 |
| 2013/0102254 A1* | 4/2013 | Cyzs | H04B 1/10 | 455/63.1 |
| 2013/0309971 A1* | 11/2013 | Kiukkonen | H04W 12/50 | 455/41.2 |
| 2013/0331031 A1* | 12/2013 | Palin | H04W 8/005 | 455/67.11 |
| 2014/0376420 A1* | 12/2014 | Zhou | H04B 1/525 | 370/278 |
| 2015/0133185 A1* | 5/2015 | Chen | H04W 72/1215 | 455/552.1 |
| 2016/0182134 A1* | 6/2016 | Kol | H04B 1/7107 | 370/329 |
| 2016/0192210 A1* | 6/2016 | Hombs | H04L 25/03006 | 455/63.1 |
| 2017/0222688 A1* | 8/2017 | Petrovic | H04B 1/525 | |
| 2017/0230150 A1* | 8/2017 | Koo | H04L 25/0204 | |
| 2017/0303071 A1* | 10/2017 | Haverinen | H04B 17/27 | |
| 2017/0346578 A1* | 11/2017 | Sundararajan | H04B 17/345 | |
| 2018/0070361 A1* | 3/2018 | Varanese | H04L 25/0224 | |
| 2018/0083808 A1* | 3/2018 | Jalloul | H04B 7/0452 | |
| 2018/0375703 A1* | 12/2018 | Kellogg | H04L 27/26 | |
| 2019/0253111 A1* | 8/2019 | Zheng | H04B 17/318 | |
| 2020/0389771 A1* | 12/2020 | Landis | H04W 4/40 | |
| 2022/0224572 A1* | 7/2022 | Sharma | H04B 1/525 | |
| 2023/0216714 A1* | 7/2023 | Sharma | H04L 25/03299 | 370/329 |

\* cited by examiner

ROBUST WLAN RECEPTION IN WiFi-BLUETOOTH COMBINATION SYSTEMS BY INTERFERENCE WHITENING

RELATED APPLICATIONS

This application is a Continuation of U.S. patent application Ser. No. 17/147,065, filed Jan. 12, 2021, which is incorporated by reference herein in its entirety.

TECHNICAL FIELD

The present disclosure relates generally to multi-communication protocol transceiver chips (e.g., combination WiFi™ and Bluetooth™ systems), and more particularly to interference reduction between transceivers of different communication protocols that are combined on the same chip.

BACKGROUND

Various devices may include transceivers configured to transmit/receive data according to any of various communication protocols. For example, a transceiver can transmit/receive signals using the WiFi protocol, the Bluetooth protocol, or the WiMAX protocol, among others. In some cases, multiple transceivers can be implemented in a single multi-protocol combination device and can share other system resources, such as transmission media. For example, a single device can include a Bluetooth transceiver as well as a wireless local area network (WLAN) transceiver (operating with the WiFi protocol, for example), which may both at least partially share a common wireless transmission medium of e.g., a 2.4 gigahertz (GHz) band.

There are a number of interference avoidance techniques that such combination devices can use to reduce interference caused by different transceivers simultaneously transmitting/receiving signals. By using such interference avoidance techniques, devices that operate within the same frequency band and within the same physical area can detect the presence of each other and adjust their communication systems to reduce the amount of overlap (interference) caused by each other. For example, Bluetooth (hereinafter referred to as "BT") packet error rates for channels can be used by WLAN transceivers to avoid higher error rate channels.

BRIEF DESCRIPTION OF THE DRAWINGS

The present embodiments are illustrated by way of example, and not of limitation, in the figures of the accompanying drawings.

DETAILED DESCRIPTION

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Many multi-protocol combination devices discussed above include both WLAN and BT transceivers/antennas, which are co-located and share the same spectrum in the 2.4 GHz ISM band. Due to this coexistence of WLAN and Bluetooth radios, and their sharing of the same band, simultaneous WLAN/Bluetooth traffic can create interference that degrades the performance of the WLAN transceiver. This interference may be severe in cases where the Bluetooth transceiver transmits a signal, while the WLAN transceiver is receiving a signal, resulting in an increase in in-band interference during WLAN reception, which can cause reception failure.

Some multi-protocol combination devices may utilize a time sharing operation such as time division multiplexing (TDM) between WLAN and Bluetooth transceivers using a coexistence (coex) arbitration mechanism to avoid mutual interference. Using TDM, the WLAN and Bluetooth transceivers may ensure that they are not transmitting or receiving at the same time as each other. However, such time sharing operations may adversely impact the WLAN throughput (i.e. the amount of data that can be transmitted will be limited). Additionally, some devices may operate in a parallel mode in which both the WLAN and Bluetooth radios operate in a parallel fashion, independent of each other. However, this type of parallel operation may only be practical? when the passive isolation between the WLAN and Bluetooth transceivers is at or greater than ~35 dB. Achieving such a level of isolation is difficult in combination devices because the antennas of various transceivers are positioned in close proximity to each other.

Further still, some devices may operate in a hybrid mode wherein certain operations use time sharing techniques and others use parallel mode operation. Hybrid mode operation may involve simultaneous WLAN/Bluetooth transceiver operation with WLAN receiver gain de-sensing during Bluetooth transmissions when the passive isolation is less than e.g., 25 dB. However, while gain de-sensing would assist in avoiding receiver radio saturation, it will not address the WLAN in-band noise floor increase due to Bluetooth interference.

The embodiments described herein are directed at techniques to de-correlate Bluetooth interference seen across WLAN receive antennas/space in a Bluetooth transceiver/

WLAN transceiver combination device wherein the WLAN transceiver has two or more receive chains. The techniques described herein may be implemented as part of, and alleviate the drawbacks of the hybrid de-sensing mode of operation discussed above. In this way, the WLAN transceiver performance may be improved, while allowing for simultaneous Bluetooth transmission and WLAN reception operation. A Bluetooth interference whitening technique may be utilized, wherein a whitening matrix is computed based on a leakage (interference) signal resulting from a Bluetooth training signal transmitted by the Bluetooth transceiver while the combination device is in a training mode. The Bluetooth transceiver may transmit the training signal while the WLAN transceiver is operational, but is not transmitting or receiving a signal. The leakage signal may leak into the WLAN transceiver (over one or multiple frequencies) at which point a set of attributes is calculated for each frequency the leakage signal is received on. One or more whitening matrixes are calculated based on the set of attributes for each frequency the leakage signal is received on.

After calculating the one or more whitening matrixes, the combination device may exit training mode. In response to the WLAN transceiver receiving a signal of interest (e.g., WiFi signal) while the Bluetooth transceiver is transmitting, an appropriate whitening matrix from the one or more whitening matrixes is selected and is then applied to the received signal of interest on each receiver chain of the WLAN transceiver to de-correlate any interference generated as a result of the Bluetooth transmission. By de-correlating such interference in this way, the performance of a demodulator of the WLAN transceiver may be optimized as the noise/interference is now uncorrelated across space/the receiver chains and thus the signal to noise ratio of the received signal of interest will be improved. Although discussed in terms of WiFi and Bluetooth communication protocols for illustrative/exemplary purposes, it should be noted that the embodiments described herein may be applied to a multi-protocol combination device employing transceivers operating under any appropriate communication protocol.

In one embodiment, an apparatus is disclosed, the apparatus comprising a first transceiver configured to transmit, using a first communication protocol, a training signal over a set of frequencies and a second transceiver configured to operate using a second communication protocol, the second transceiver comprising two or more receiver chains and configured to receive a leakage signal corresponding to interference from the training signal. The apparatus may further comprise a processing device configured to compute one or more whitening filters based on a set of attributes of the leakage signal for each of the set of frequencies the training signal is transmitted over. The processing device may further, in response to the second transceiver receiving a desired signal, apply a whitening filter of the one or more whitening filters to the desired signal to de-correlate interference as a result of the first communication protocol seen across the receive chains of the second transceiver.

Figure 1:
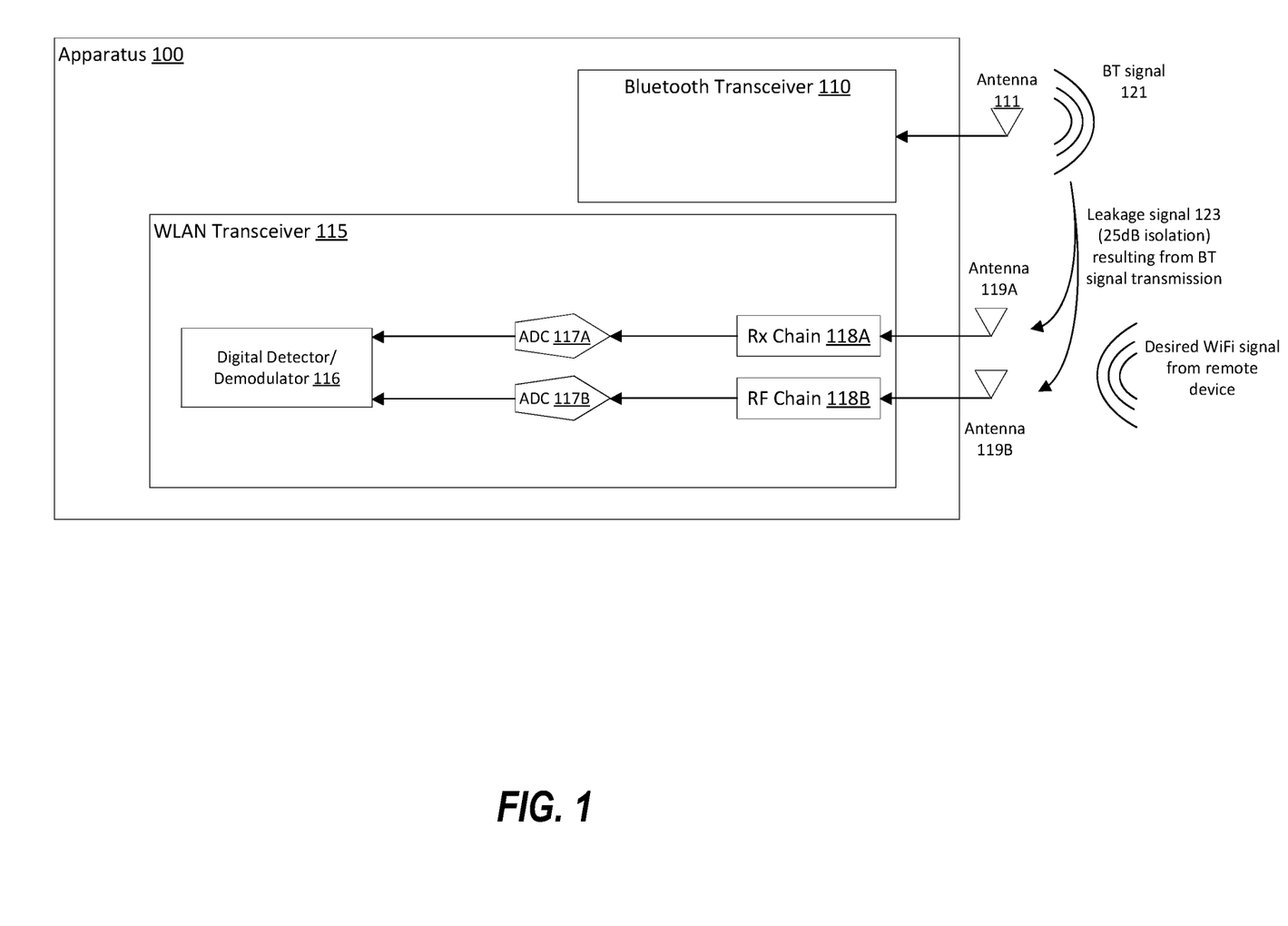
FIG. 1 is a block diagram illustrating an apparatus, according to some embodiments of the present disclosure.

FIG. 1 is a block diagram illustrating an apparatus 100, which may be a multi-protocol combination communication chip that combines a first transceiver operating using a first communication protocol and a second transceiver operating using a second communication protocol. In the example shown in the FIGS., apparatus 100 may be a WLAN and BT transceiver combination chip, in accordance with some embodiments of the present disclosure. The apparatus 100 may include a BT transceiver 110 and a WLAN transceiver 115. The WLAN transceiver 115 may comprise two or more receive chains 118 (in the example of FIG. 1, the WLAN transceiver 115 comprises two receive chains 118A and 118B), and each receive chain 118 may be comprised of signal processing components such as a low noise amplifier, a mixer, a variable gain amplifier, and a low pass filter (not illustrated). Each receive chain 118 may be coupled to a respective antenna 119 through which it may send and receive signals. Each receive chain 118 may also be coupled to an analog to digital converter (ADC) which it may use to digitize received signals and output the digitized signals to a digital demodulator 116 (also referred to as a digital detector) which may extract any information content from the received digitized signals (e.g., by extracting the information bearing signal from a carrier wave). Similarly, the BT transceiver 110 may be coupled to antenna 111 which it may use to send and receive signals. As discussed above, because the WLAN and BT transceivers are co-located on the same chip and share the same band, simultaneous WLAN/BT traffic may create interference which significantly degrades WLAN performance. This interference may be severe in cases where the BT transceiver 110 is transmitting and the WLAN transceiver 115 is receiving, which results in a severe increase in in-band interference during WLAN reception, which can cause reception failure. FIG. 1 illustrates a BT signal 121 being transmitted by the BT transceiver 110, and a resultant leakage signal 123 (e.g., 25 dB isolation) originating from the BT signal 121 that interferes with the reception of WiFi signals by the WLAN transceiver 115. The interference caused by the leakage signal 123 can be seen as correlated noise across the receiver chains 118 of the WLAN transceiver 115 (i.e. the interference/noise is correlated across space). The demodulator 116 may include a maximal ratio combiner and a maximum-likelihood detector, which may provide optimum performance when the overall noise and interference is uncorrelated across space/the receiver chains 118.

Figure 2A:
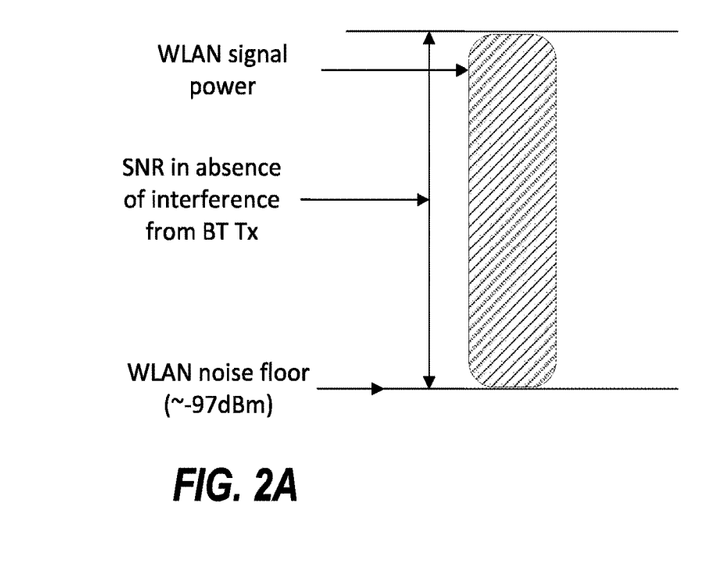
FIG. 2A is a diagram illustrating a noise floor of WLAN signal power without Bluetooth interference, according to some embodiments of the present disclosure.
Figure 2B:
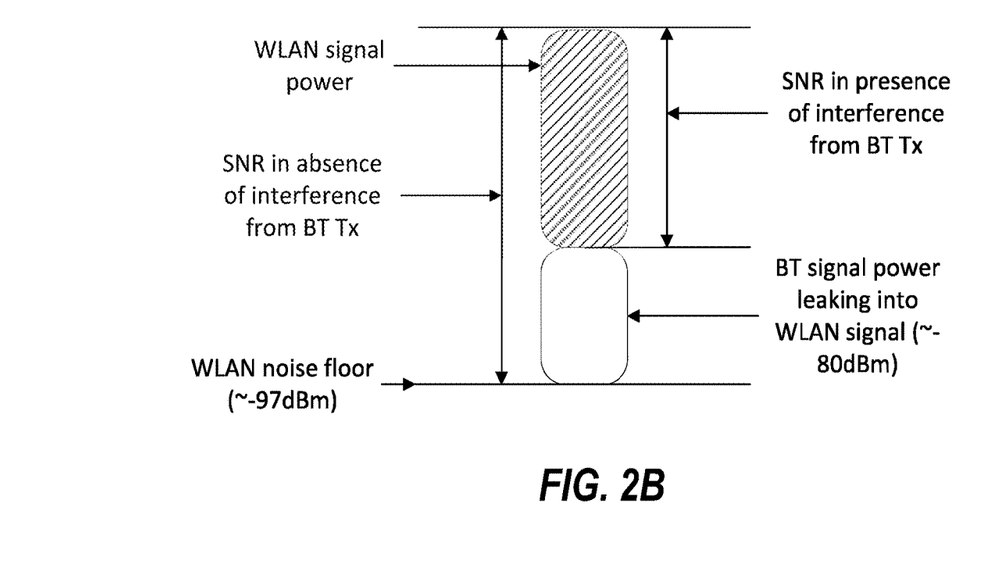
FIG. 2B is a diagram illustrating a noise floor of WLAN signal power with Bluetooth interference, according to some embodiments of the present disclosure.

FIG. 2A illustrates the signal to noise ratio (SNR) of a desired signal received by the WLAN transceiver 115 in the absence of the leakage signal 123 generated by the BT transceiver 110 as a result of transmission of BT signal 121. As can be seen, the WLAN noise floor is at approximately −97 dBm in the absence of the leakage signal 123, and the SNR of the desired signal is higher. FIG. 2B illustrates the scenario once the BT signal 121 is introduced. The signal power of the leakage signal 123 begins leaking into the desired signal power and the WLAN noise floor increases to approximately −80 dBm. As can be seen, the SNR of the desired signal suffers and may result in reception failure. Embodiments of the present disclosure provide techniques to de-correlate the BT interference across receiver chains 118 so as to improve the performance of WLAN transceiver 115, while allowing for simultaneous BT transmission and WLAN reception operation by the apparatus 100.

Figure 3:
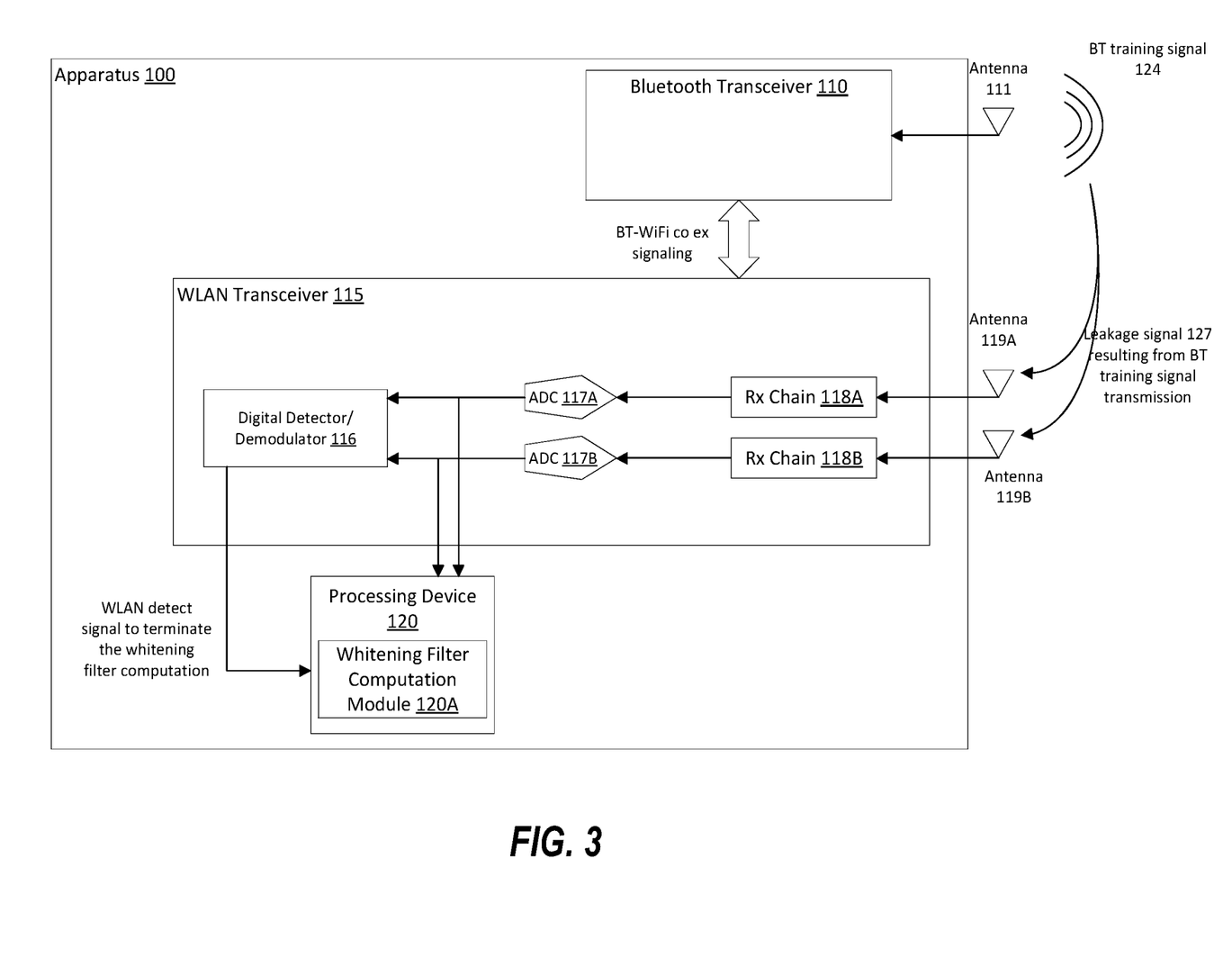
FIG. 3 is a block diagram illustrating an apparatus, according to some embodiments of the present disclosure.

FIG. 3 illustrates the apparatus 100 according to some embodiments of the present disclosure. As shown in FIG. 3, the apparatus 100 may include a processing device 120 which may include a whitening filter computation module 120A. Processing device 120 may execute the module 120A to perform the techniques described herein. Although illustrated as e.g., a firmware module within the processing device 120, the functionality of the module 120A may be realized using dedicated hardware (e.g., an application specific integrated circuit (ASIC)) or software stored in a memory device and accessed/executed by processing device 120. The processing device 120 may utilize techniques such as adaptive frequency hopping (AFH) to reduce the effects of interference between BT and other types of devices. AFH adapts the access channel sharing method so that BT transmission does not occur on channels that have significant interference (e.g., channels that are used by the WLAN transceiver 115). By using interference avoidance, devices that operate within the same frequency band and within the same physical area can detect the presence of each other and adjust their communication systems to reduce the amount of overlap (interference) caused by each other. The adaptive frequency hopping process reassigns the transmission of BT packets on frequency channels that have interference to other channels that have lesser interference levels. This reduced level of interference increases the amount of successful transmissions therefore increasing the overall efficiency and increased overall data transmission rates for the Bluetooth device and reduces the effects of interference from the Bluetooth transmitter to other devices. The processing device 120 may map the channel frequencies that are available for transmission by the BT transceiver 110 and store the mapping as an AFH map (not shown), which it may continuously update.

Upon execution of the module 120A, the processing device 120 may shift the apparatus 100 into a training phase where the BT transceiver 110 may transmit a training signal 124 across all channel frequencies available in the AFH map. Thus, for each of the available channel frequencies in the AFH map, each antenna 119 of the WLAN transceiver 115 may receive a leakage (interference) signal 127 resulting from transmission of the training signal 124, and process the leakage signal 127 using the respective receive chain 118 and the respective ADC 117. The WLAN transceiver 115 may provide the output of each ADC 117 to the processing device 120 which may (executing module 120A) determine a set of attributes of the leakage signal 127 for each frequency the leakage signal is received on (i.e., each available channel frequency in the AFH map) to obtain one or more sets of attributes. The processing device 120 may use the one or more sets of attributes to generate a whitening filter (also referred to as a whitening transformation) for each frequency the leakage signal is received on. A whitening transformation is a linear transformation that transforms a vector of random variables with a known covariance matrix into a set of new variables whose covariance is the identity matrix, meaning that they are uncorrelated and each have variance of "1."

The set of attributes of the leakage signal 127 for a particular frequency may include the power of the leakage signal 127 at each of the receive chains 118 and a cross-correlation of the leakage signal 127 at each pair of receiver chains 118 among the two or more receiver chains 118. In the example of FIG. 3, for each frequency that the leakage signal 127 is received on, processing device 120 may calculate the power of the leakage signal 127 at each receiver chain 118, and measure the cross-correlation of the leakage signal 127 between receiver chains 118A and 118B. In another example, if WLAN transceiver 115 has 4 receiver chains 118A-D, then for each frequency that the leakage signal 127 is received on, processing device 120 may calculate the power of the leakage signal 127 at each receiver chain 118, and measure the cross-correlation of the leakage signal 127 between receiver chains 118A and B, receiver chains 118B and C, receiver chains 118C and D, and receiver chains 118D and A. For each frequency that the leakage signal 127 is received on, the processing device 120 (executing module 120A) may utilize the calculated set of attributes to generate a whitening filter (whitening transformation) for that particular frequency. Processing device 120 may ensure that no WiFi signal is being transmitted or received by the WLAN transceiver 115 when the leakage signal 127 is received at antennas 119 (i.e., during training mode/transmission of the training signal 124), otherwise it may abort the whitening filter calculation operation and re-initialize the training phase. Since the BT antenna 111 is co-located with WLAN antennas 119, there is expected to be minimal time variation of the BT transmission/WLAN reception link, which allows for the training phase to be initiated less frequently.

For each frequency the leakage signal 127 is received on, the set of attributes of the leakage signal 127 will be different. If the number of frequencies (hops) that the leakage signal 127 is received on is large, it may be difficult for the processing device 120 to calculate a whitening filter for each of those frequencies. Thus, in some embodiments, processing device 120 may group the frequencies that the leakage signal 127 is received on together into subsets and calculate a whitening filter for each subset of frequencies instead of calculating a whitening filter for each individual frequency. In some embodiments, the processing device 120 may determine a static frequency grouping using correlation statistics of the leakage signal at each and every frequency that the leakage signal 127 is received on. The processing device 120 may group a set of frequencies together in one group if they have similar correlation coefficients. Processing device 120 may calculate a whitening filter for a subset of frequencies based on the set of attributes for each frequency in the subset. Processing device 120 may store the calculated whitening filters in an on-board memory, or in a separate memory device (not shown) of apparatus 100.

Figure 4:
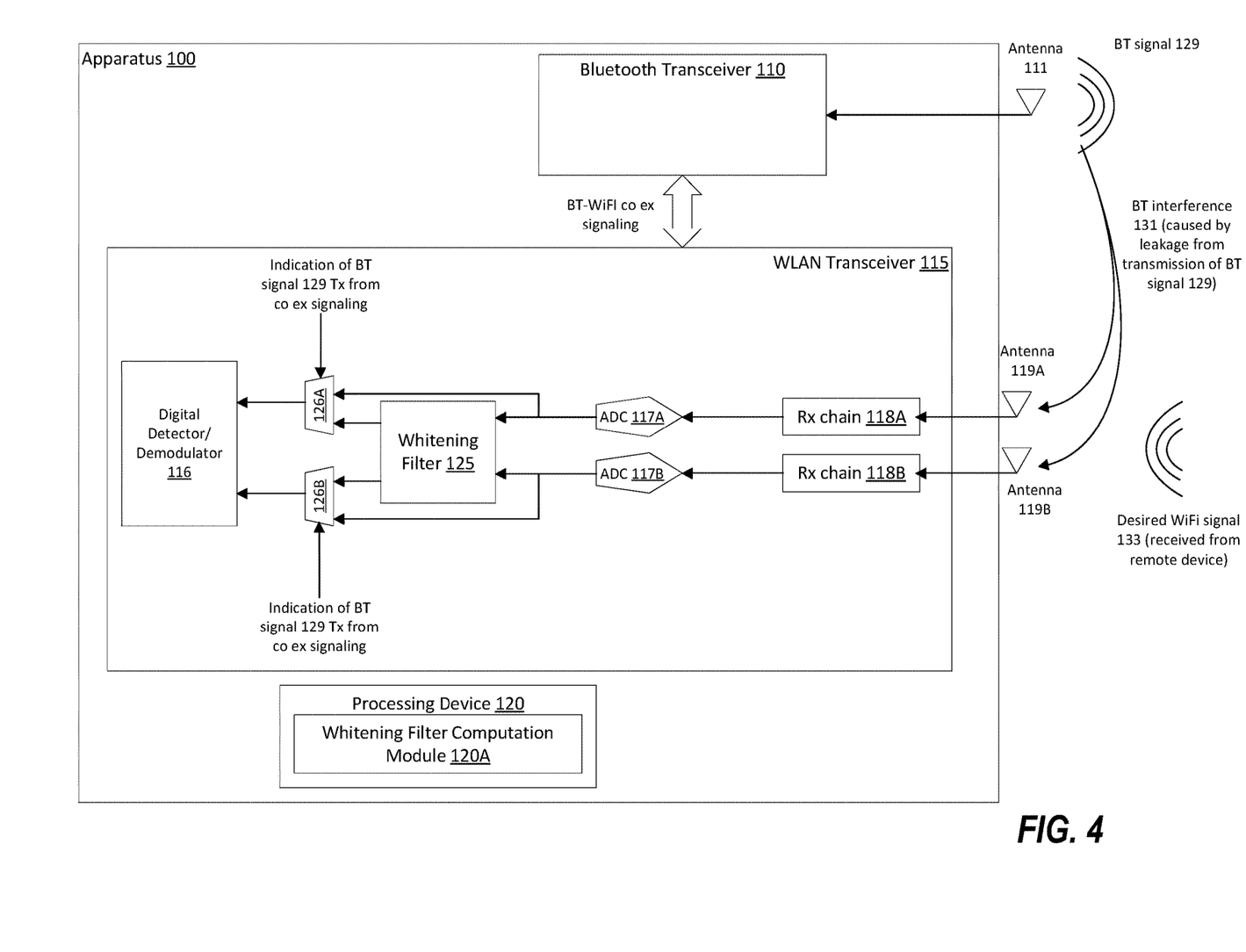
FIG. 4 is a block diagram illustrating an apparatus, according to some embodiments of the present disclosure.

Once the whitening filter is determined for each of the frequencies (or each subset of frequencies), the processing device 120 may exit apparatus 100 from training mode and may utilize an appropriate whitening filter 125 to transform a desired WiFi signal received by the WLAN transceiver 115 from a remote device (not shown in the FIGS.). FIG. 4 illustrates the apparatus 100 while applying the whitening filter 125 to transform a received WiFi signal 133 that includes a BT interference component 131 as a result of the BT transceiver 110 simultaneously transmitting BT signal 129 (i.e. includes a leakage signal resulting from transmission of BT signal 129). The processing device 120 may select the appropriate whitening filter based on the frequency of the BT signal 129 (e.g., a whitening filter computed for a frequency that most closely matches the frequency of the BT signal 129). It should be noted that in some embodiments, processing device 120 may utilize the whitening filter 125 to transform the received WiFi signal 133 only when there is ongoing (simultaneous) transmission by the BT transceiver 110 (and thus, ongoing BT interference) during reception of the WiFi signal 133. When the WLAN transceiver 115 is receiving the WiFi signal 133, the BT transceiver 110 may indicate any ongoing transmission (e.g., of BT signal 129) to the WLAN transceiver 115 using BT-WiFi coex signaling (as shown in FIG. 4). The processing device 120 may apply the whitening filter 125 to the received WiFi signal 133 (which includes the BT interference component 131 generated by simultaneous transmission of BT signal 129 (also referred to herein as a "data signal") by BT transceiver 110) at the output of the ADCs 117A and 117B, to de-correlate the BT interference component 131 of the received WiFi signal 133. Stated differently, the whitening filter (whitening matrix) 125 may be multiplied with the received WiFi signal 133 on the two receiver chains 118A and 118B to de-correlate the BT interference component 131. As discussed above, the demodulator 116 may comprise a maximal ratio combiner and a maximum-likelihood detector which provide optimal performance when the overall noise and interference is uncorrelated across space/the receiver channels 118. Thus, by de-correlating the BT interference component 131, the performance of the demodulator 116 (e.g., the maximal ratio combiner along and maximum-likelihood detector thereof) will improve resulting in the SNR of the received WiFi signal 133 at the demodulator 116 improving. Stated differently, the ability of the demodulator 116 to separate the received WiFi signal 133 from the BT interference component 131 will improve.

In some embodiments, the apparatus 100 may include logic blocks 126A and 126B which may function as selectors to receive the BT-WiFi coex signaling as well as the transformed and untransformed (e.g., not subject to the whitening filter 125) versions of the WiFi signal 133. If the BT-WiFi coex signaling indicates that transmission of BT signal 129 is ongoing, then the selectors 126A and 126B may pass the transformed versions of the WiFi signal 133 to the demodulator 116, otherwise the selectors 126A and 126B may pass the untransformed versions of the WiFi signal 133 to the demodulator 116.

The processing device 120 may initiate additional training phases to update the one or more whitening filters at regular intervals, or based on any appropriate criteria. As discussed above, because the BT antenna 111 is co-located with WLAN antennas 119, there is expected to be minimal time variation of the BT transmission/WLAN reception link, which allows for the training phase to be initiated less frequently. The processing device 120 may trigger additional training phases either before association with an access point or by indicating to an access point that the apparatus 100 will be entering a power save mode so as to not schedule intended traffic.

Figure 5:
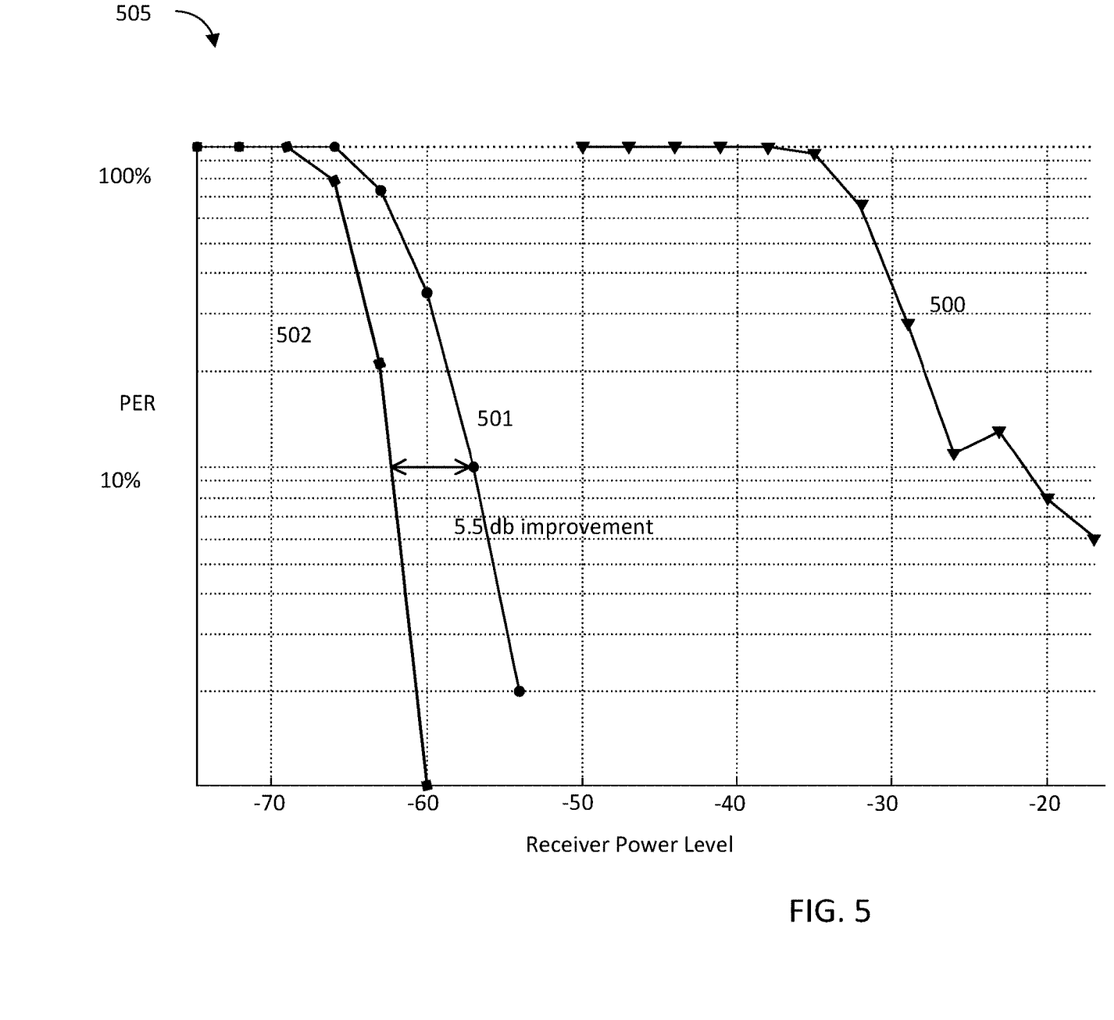
FIG. 5 is a diagram of a graph illustrating the noise reduction realized by some embodiments of the present disclosure.

FIG. 5 illustrates a graph 505 illustrating noise reduction that may be realized by the interference reduction techniques described herein. Graph 505 plots the packet error rate (on the Y-axis) versus the receiver power level (X-axis) for signals received in the presence of BT interference without any interference reduction (represented by curve 500), with a level of interference reduction achieved with standard interference reduction techniques (represented by curve 501), and with interference reduction using techniques according to embodiments of the present disclosure (represented by curve 502). As shown in FIG. 5, generally, as the receiver power level decreases, the packet error rate increases, and as the receiver power level increases, the packet error rate will decrease. Observing curve 500, the receiver power level when signal represented by curve 500 has a 10% error rate is ~−30 dB, which is relatively high. In order to reduce the level of receiver power required to achieve the 10% packet error rate, interference reduction techniques may be applied. Observing curve 501 (representing a signal which has been received with standard interference reduction techniques), it can be seen that the receiver power level required to achieve a 10% packet error rate is lower (~−55 dB). Observing curve 502 (representing a signal which has been received with interference reduction techniques according to the embodiments described herein), it can be seen that the receiver power level required to achieve a 10% packet error rate is ~−60.5 dB, which represents a 5.5 dB improvement over standard interference reduction techniques.

Figure 6:
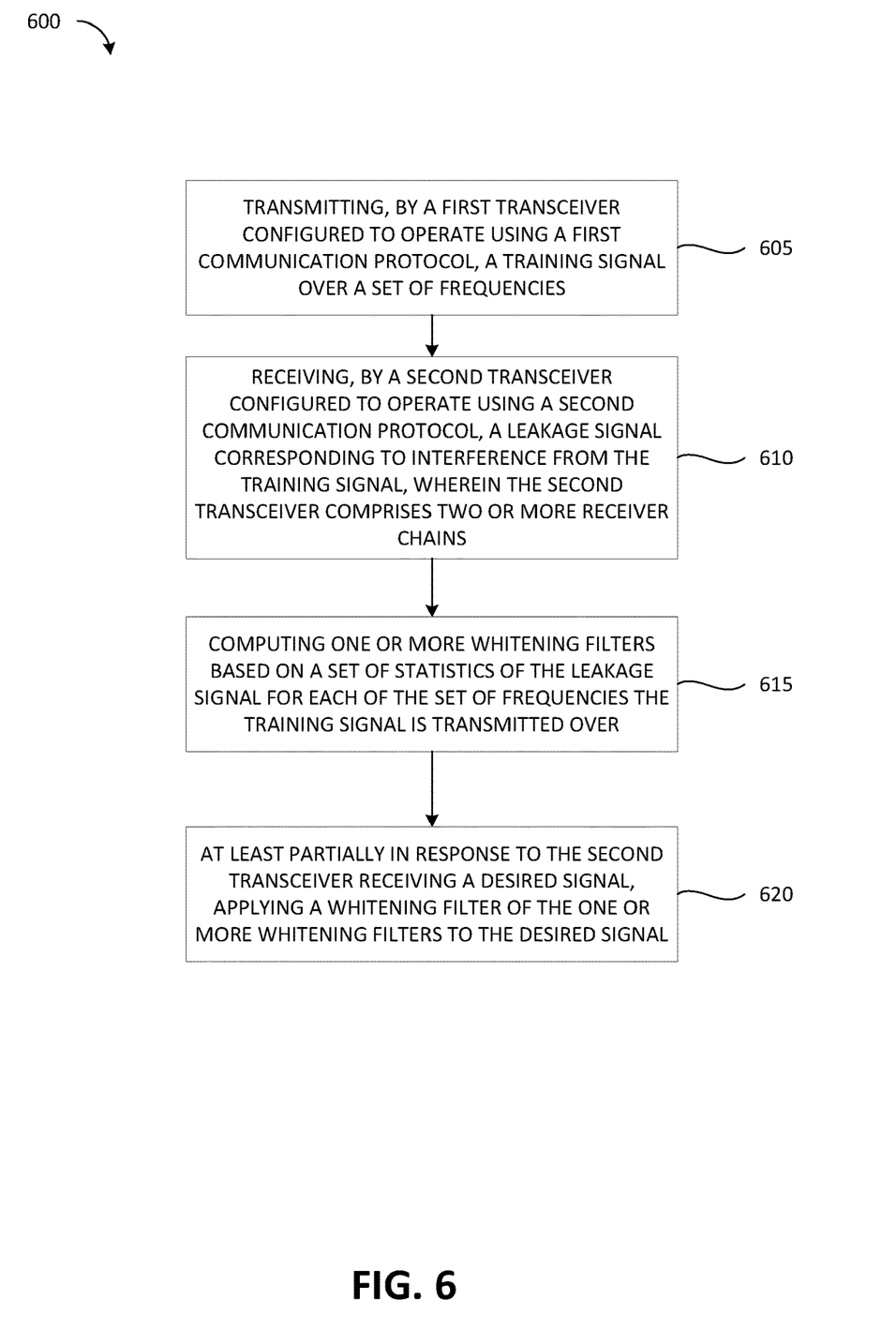
FIG. 6 is a flow diagram illustrating a method for de-correlating noise, according to some embodiments of the present disclosure.

FIG. 6 is a flow diagram of a method 600 for de-correlating Bluetooth interference seen across WLAN receive chains/space in a Bluetooth transceiver/WLAN transceiver combination device, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 600 may be performed by a processing device 120 executing module 120A.

With reference to FIGS. 3 and 4 as well, at block 605, upon execution of the module 120A, the processing device 120 may shift the apparatus 100 into a training phase where the BT transceiver 110 may transmit a training signal 124 across all channel frequencies available in the AFH map. Thus, for each of the available channel frequencies in the AFH map, at block 610, each antenna 119 of the WLAN transceiver 115 may receive a leakage (interference) signal 127 resulting from transmission of the training signal 124, and process the leakage signal 127 using the respective receive chain 118 and the respective ADC 117. The WLAN transceiver 115 may provide the output of each ADC 117 to the processing device 120 which may (executing module 120A) determine a set of attributes of the leakage signal 127 for each frequency the leakage signal is received on (i.e., each available channel frequency in the AFH map) to obtain one or more sets of attributes. At block 615, the processing device 120 may use the one or more sets of attributes to generate a whitening filter (also referred to as a whitening transformation) for each frequency the leakage signal is received on. A whitening transformation is a linear transformation that transforms a vector of random variables with a known covariance matrix into a set of new variables whose covariance is the identity matrix, meaning that they are uncorrelated and each have variance of "1."

Once the whitening filter is determined for each of the frequencies (or each subset of frequencies), at block 620 the processing device 120 may exit apparatus 100 from training mode and may utilize an appropriate whitening filter 125 to transform a desired WiFi signal received by the WLAN transceiver 115 from a remote device (not shown in the FIGS.). FIG. 4 illustrates the apparatus 100 while applying the whitening filter 125 to transform a received WiFi signal 133 that includes a BT interference component 131 as a result of the BT transceiver 110 simultaneously transmitting BT signal 129 (i.e. includes a leakage signal resulting from transmission of BT signal 129). The processing device 120 may select the appropriate whitening filter based on the frequency of the received WiFi signal 133 (e.g., a whitening filter computed for a frequency that most closely matches the frequency of the received WiFi signal 13). It should be noted that in some embodiments, processing device 120 may utilize whitening filter 125 to transform the received WiFi signal 133 only when there is ongoing (simultaneous) transmission by the BT transceiver 110 (and thus, ongoing BT interference) during reception of the WiFi signal 133. When the WLAN transceiver 115 is receiving the WiFi signal 133, the BT transceiver 110 may indicate any ongoing transmission (e.g., of BT signal 129) to the WLAN transceiver 115 using BT-WiFi coex signaling (as shown in FIG. 4). The processing device 120 may apply the whitening filter 125 to the received WiFi signal 133 (which includes the BT interference component 131 generated by simultaneous transmission of BT signal 129 by BT transceiver 110) at the output of the ADCs 117A and 117B, to de-correlate the BT interference component 131 of the received WiFi signal 133. Stated differently, the whitening matrix 125 may be multiplied with the received WiFi signal 133 on the two receiver chains 118A and 118B to de-correlate the BT interference component 131. As discussed above, the demodulator 116 may comprise a maximal ratio combiner and a maximum-likelihood detector which provide optimal performance when the overall noise and interference is uncorrelated across space/the receiver channels 118. Thus, by de-correlating the BT interference component 131, the performance of the demodulator 116 (e.g., the maximal ratio combiner along and maximum-likelihood detector thereof) will improve resulting in the SNR of the received WiFi signal 133 at the demodulator 116 improving. Stated differently, the ability of the demodulator 116 to separate the received WiFi signal 133 from the BT interference component 131 will improve.

Figure 7:
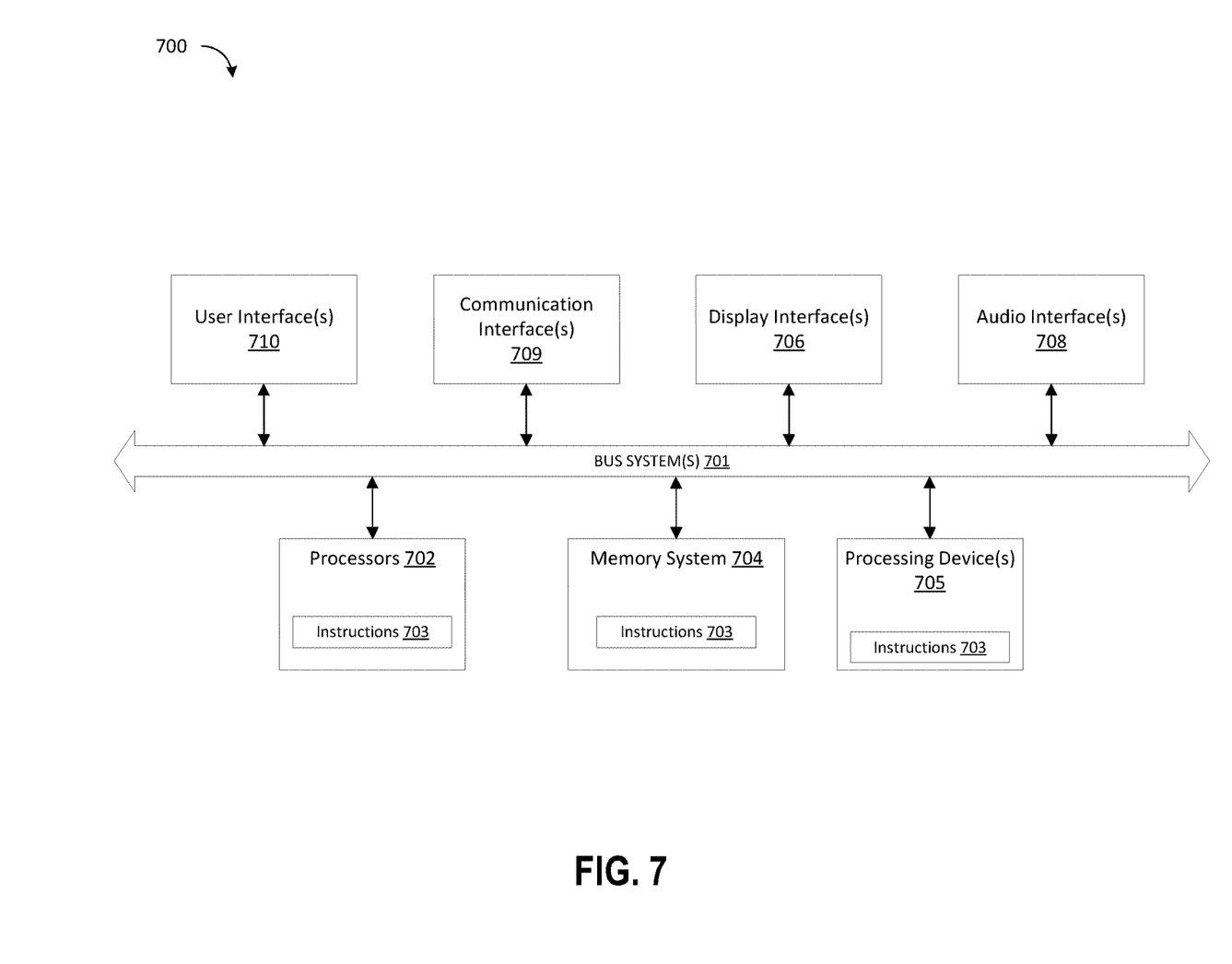
FIG. 7 illustrates an embodiment of a communication device, according to some embodiments of the present disclosure.

FIG. 7 is a block diagram illustrating a communication device 700, in accordance with some embodiments of the present disclosure. The communication device 700 may fully or partially include and/or operate the example embodiments of the apparatus 100 or portions thereof as described with respect to FIGS. 1-4. The communication device 700 may be in the form of a computer system within which sets of instructions may be executed to cause the communication device 700 to perform any one or more of the methodologies discussed herein. The communication device 700 may operate as a standalone device or may be connected (e.g., networked) to other machines. In a networked deployment, the communication device 700 may operate in the capacity of a server or a client machine in server-client network environment, or as a peer machine in a P2P (or distributed) network environment.

The communication device 700 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single communication device 700 is illustrated, the term "device" shall also be taken to include any collection of machines that individually or jointly execute a set (or multiple sets) of instructions to perform any one or more of the methodologies discussed herein.

The communication device 700 is shown to include processor(s) 702. In embodiments, the communication device 700 and/or processors(s) 702 may include processing device(s) 705 such as a System on a Chip processing device, developed by Cypress Semiconductor Corporation, San Jose, Calif. Alternatively, the communication device 700 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 701 may include a communication block (not shown) to communicate with an internal or external component, such as an embedded controller or an application processor, via communication interfaces(s) 709 and/or bus system 701.

Components of the communication device 700 may reside on a common carrier substrate such as, for example, an IC die substrate, a multi-chip module substrate, or the like. Alternatively, components of the communication device 700 may be one or more separate ICs and/or discrete components.

The memory system 704 may include volatile memory and/or non-volatile memory which may communicate with one another via the bus system 701. The memory system 704 may include, for example, random access memory (RAM) and program flash. RAM may be static RAM (SRAM), and program flash may be a non-volatile storage, which may be used to store firmware (e.g., control algorithms executable by processor(s) 702 to implement operations described herein). The memory system 704 may include instructions 703 that when executed perform the methods described herein. Portions of the memory system 704 may be dynamically allocated to provide caching, buffering, and/or other memory based functionalities.

The memory system 704 may include a drive unit providing a machine-readable medium on which may be stored one or more sets of instructions 703 (e.g., software) embodying any one or more of the methodologies or functions described herein. The instructions 703 may also reside, completely or at least partially, within the other memory devices of the memory system 704 and/or within the processor(s) 702 during execution thereof by the communication device 700, which in some embodiments, constitutes machine-readable media. The instructions 703 may further be transmitted or received over a network via the communication interfaces(s) 709. The communication interface(s) 709 may be where the apparatus 100 discussed herein is implemented.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The communication device 700 is further shown to include display interface(s) 706 (e.g., a liquid crystal display (LCD), touchscreen, a cathode ray tube (CRT), and software and hardware support for display technologies), audio interface(s) 708 (e.g., microphones, speakers and software and hardware support for microphone input/output and speaker input/output). The communication device 700 is also shown to include user interface(s) 710 (e.g., keyboard, buttons, switches, touchpad, touchscreens, and software and hardware support for user interfaces).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. An apparatus comprising:
 a first transceiver for operable communication over a first communication protocol;
 a second transceiver for operable communication over a second communication protocol, wherein the second transceiver comprises:
  a first receiver chain, and
  a second receiver chain, wherein the first and second receiver chains are for receiving a leakage signal corresponding to a training signal transmitted by the first transceiver over a set of frequencies;
 a processing device for computing at least one whitening filter value based on the leakage signal for each of the set of frequencies; and
 a whitening filter applicable to receive signals received by the second transceiver.

2. The apparatus of claim 1, wherein the processing device is for analyzing the leakage signal at the first receiver chain and the second receiver chain and for determining a set of attributes of the leakage signal for each of the set of frequencies.

3. The apparatus of claim 2, wherein the set of attributes of the leakage signal include at least one of:
 a power level of the leakage signal; and
 a cross-correlation of the leakage signal.

4. The apparatus of claim 2, wherein set of attributes of the leakage signal are determined for each of the first and second receiver chains.

5. The apparatus of claim 2, wherein the processing device is for grouping the frequencies in the set of frequencies into one or more subsets of frequencies, and wherein the whitening filter includes one or more sub-filters corresponding to each of the one or more subsets of frequencies.

6. The apparatus of claim 1, wherein the whitening filter is a linear transformation for converting a vector of random variables comprising a known covariance matrix to a set of new variables for which the covariance is an identity matrix.

7. The apparatus of claim 1, wherein a value of the whitening filter is computed based on leakage signals received by the second transceiver in the absence of communication signals according to the second communication protocol.

8. The apparatus of claim 1, wherein the processing device is further to:
   determine whether the first transceiver is transmitting a data signal simultaneously with the second transceiver receiving at least one received signal;
   in response to determining that the first transceiver is transmitting a data signal simultaneously with the second transceiver receiving the received signal, multiply the whitening filter with the received signal on each of first and second receiver chains to de-correlate interference introduced into the received signal by the data signal.

9. The apparatus of claim 1, wherein:
   the first communication protocol is one of Bluetooth or Zigbee; and
   the second communication protocol is wireless local area network (WLAN).

10. The apparatus of claim 1, wherein the processing device includes the whitening filter.

11. A system comprising:
   a plurality of antennas; and
   a multi-protocol communication device coupled to the plurality of antennas, the multi-protocol communication comprising:
      a first transceiver coupled to at least one of the plurality of antennas, the first transceiver for operable communication over a first communication protocol;
      a second transceiver coupled to at least two of the plurality of antennas, the second transceiver for operable communication over a second communication protocol, wherein the second transceiver comprises:
         a first receiver chain, and
         a second receiver chain, wherein the first and second receiver chains are for receiving a leakage signal corresponding to a training signal transmitted by the first transceiver over a set of frequencies;
      a processing device for computing at least one whitening filter value based on the leakage signal for each of the set of frequencies; and
      a whitening filter applicable to receive signals received by the second transceiver.

12. The system of claim 11, wherein the processing device is for analyzing the leakage signal at the first receiver chain and the second receiver chain and for determining a set of attributes of the leakage signal for each of the set of frequencies.

13. The system of claim 12, wherein the set of attributes of the leakage signal include at least one of:
   a power level of the leakage signal; and
   a cross-correlation of the leakage signal.

14. The system of claim 12, wherein the set of attributes of the leakage signal are determined for each of the first and second receiver chains.

15. The system of claim 12, wherein the processing device is for grouping the frequencies in the set of frequencies into one or more subsets of frequencies, and wherein the whitening filter includes one or more sub-filters corresponding to each of the one or more subsets of frequencies.

16. The system of claim 11, wherein the whitening filter is a linear transformation for converting a vector of random variables comprising a known covariance matrix to a set of new variables for which the covariance is an identity matrix.

17. The system of claim 11, wherein the whitening filter values is computed based on leakage signals received by the second transceiver in the absence of communication signals according to the second communication protocol.

18. The system of claim 11, wherein the processing device is further to:
   determine whether the first transceiver is transmitting a data signal simultaneously with the second transceiver receiving at least one received signal;
   in response to determining that the first transceiver is transmitting a data signal simultaneously with the second transceiver receiving the received signal, multiply the whitening filter with the received signal on each of first and second receiver chains to de-correlate interference introduced into the received signal by the data signal.

19. The system of claim 11, wherein:
   the first communication protocol is one of Bluetooth or Zigbee; and
   the second communication protocol is wireless local area network (WLAN).

20. The system of claim 11, wherein the processing device includes the whitening filter.

* * * * *